United States Patent
Razaa (12)

(10) Patent No.: US 6,780,449 B2
(45) Date of Patent: Aug. 24, 2004

(54) PROCESS FOR PREPARING VACUUM TUMBLED FOOD PRODUCTS

(75) Inventor: Harith A. Razaa, Cincinnati, OH (US)

(73) Assignee: Azure Waves Seafood, Inc., Cincinnati, OH (US)

(*) Notice: Subject to any disclaimer, the term of this patent is extended or adjusted under 35 U.S.C. 154(b) by 414 days.

(21) Appl. No.: 10/040,327

(22) Filed: Nov. 7, 2001

(65) Prior Publication Data

US 2003/0087013 A1 May 8, 2003

(51) Int. Cl.$^7$ ............................. A23B 4/00; A23L 1/314; A23L 1/318
(52) U.S. Cl. ..................... 426/281; 426/291; 426/296; 426/302; 426/332; 426/335; 426/641; 426/643; 426/644; 426/646
(58) Field of Search .......................... 426/281, 291, 426/296, 302, 332, 335, 641, 643, 644, 646

(56) References Cited

U.S. PATENT DOCUMENTS

| | | | | |
|---|---|---|---|---|
| 5,543,163 A | * | 8/1996 | Groves | 426/281 X |
| 5,676,994 A | * | 10/1997 | Eskins et al. | 426/602 |
| 5,827,558 A | * | 10/1998 | Corser et al. | 426/643 X |
| 5,882,713 A | * | 3/1999 | Eskins et al. | 426/578 |
| 6,187,366 B1 | * | 2/2001 | Ensor et al. | 426/641 |

\* cited by examiner

Primary Examiner—Arthur L. Corbin
(74) Attorney, Agent, or Firm—Dinsmore & Shohl LLP

(57) ABSTRACT

Processes for preparing a food product and products produced by such processes comprise vacuum tumbling a food product with an aqueous flavor solution and/or with a dispersion of a lipid in an aqueous starch solution. Optionally, the processes may further comprise freezing the vacuum tumbled food product in a liquid freeze bath.

24 Claims, No Drawings

PROCESS FOR PREPARING VACUUM TUMBLED FOOD PRODUCTS

FIELD OF THE INVENTION

The present invention is directed to vacuum tumbled food products and methods for preparing the same. More specifically, the present invention relates to vacuum tumbled food products and methods which employ an aqueous flavor solution and/or a dispersion of a lipid in an aqueous starch solution.

BACKGROUND OF THE INVENTION

Techniques for processing and preparing food items, particularly protein based and/or seafood related items, are constantly changing and improving to meet stringent demands of the food processing industry as well as demands and expectations of the ultimate consumer. Not only is it desirable for these techniques to produce fresh quality products with improved flavors, nutritional values and shelf lives, many consumers also desire these products to convey a satisfying mouth feel while remaining visually pleasing.

One food processing technique which has been used to achieve some of the abovementioned desired properties is vacuum tumbling. Vacuum tumblers or vacuum tumble-massagers provide a method of mechanically agitating a food product such that moisture and/or seasonings at least partially penetrate the products. Processes for vacuum tumbling food products, particularly seafood related products, have been developed and are described in U.S. Pat. No. 5,543,163, issued Aug. 6, 1996 to Groves, entitled "Method for Enhancing the Flavor and Shelf Life of Food Products", incorporated herein by reference. The Groves process is know by those skilled in the art as the Grovac™ process, and involves a vacuum tumbling process that extracts the off-flavor components of particular animal products. According to this process, the tissue of the animal product is perforated prior to the vacuum tumbling process and a hypotonic saline solution, organic acid additive and yeast product are incorporated into the process. The vacuum tumbler is adapted to receive the animal products and a fluid mixture, which includes both water and sodium chloride. The Groves process is associated with enhancing the appearance and taste of the food products while improving their shelf life through the extraction of various chemicals.

While the abovementioned process has proven useful for solving some of the problems experienced within the food processing industry, developing improved food products exhibiting many of the desirable food-related attributes expected by many consumers has remained difficult. Accordingly, there is a desire for providing food products and methods for preparing such food products which exhibit all of these qualities while maintaining the quality and taste consumers expect.

SUMMARY OF THE INVENTION

It is therefore an object of the invention to provide new processes for preparing food products and to provide improved food products. In one embodiment, the present invention is directed to a process for preparing a food product, comprising: (a) vacuum tumbling a food product with an aqueous flavor solution and with a dispersion of a lipid in an aqueous starch solution; and (b) freezing the vacuum tumbled food product in a liquid freeze bath. The invention is also directed to food products produced by such processes.

In another embodiment, the present invention is directed to a process for preparing a food product, comprising: (a) vacuum tumbling a food product with an aqueous flavor solution and with a dispersion of a lipid in an aqueous starch solution; (b) coating the vacuum tumbled food product with a second dispersion of a lipid in an aqueous starch solution; and (c) freezing the coated food product in a liquid freeze bath. The invention is further directed to food products produced by such processes.

In a further embodiment, the present invention is directed to a process for preparing a food product, comprising: vacuum tumbling the food product with an aqueous flavor solution and with a dispersion of a lipid in an aqueous starch solution.

In still another embodiment, the present invention is directed to a process for preparing a food product, comprising: (a) vacuum tumbling a food product with an aqueous flavor solution; (b) coating the vacuum tumbled food product with a dispersion of a lipid in an aqueous starch solution; and (c) freezing the coated food product in a liquid freeze bath.

In yet a further embodiment, the present invention is directed to a vacuum tumbled food product comprising a coating formed from a lipid dispersed in an aqueous starch solution.

Accordingly, the present invention provides novel food products and processes for preparing such food products which overcome one or more disadvantages of the prior art.

These and additional objects, advantages and novel features of the present invention will become apparent to those skilled in the art from the following detailed description, which is simply, by way of illustration, various modes contemplated for carrying out the invention. As will be realized, the invention is capable of other different obvious aspects all without departing from the invention. Accordingly, the specification is illustrative in nature and not restrictive.

DETAILED DESCRIPTION

The present invention is directed to food products and processes for preparing such food products. More particularly, the food products of the present invention are vacuum tumbled food products comprising an aqueous flavor solution and/or a dispersion of a lipid in an aqueous starch solution. Other embodiments comprise a freezing step such that the vacuum tumbled food products are frozen in a liquid freeze bath.

As used herein, "comprising" means that other steps and ingredients can be added. This term encompasses the terms "consisting of" and "consisting essentially of". The phrase "consisting essentially of" means that the products and processes may include additional ingredients, but only if the additional ingredients do not materially alter the basic and novel characteristics of the claimed products and/or processes.

As used herein, "vacuum tumble" refers generally to a process for mechanically tumbling a product in a tumbler device, massager and/or chamber such that moisture, flavorings and/or seasonings are able to at least partially penetrate the product. In one embodiment, the vacuum tumbling process is conducted with a combination of one or more aqueous flavor solutions together with a dispersion of a lipid in an aqueous starch solution. As will be described in further detail below, in one embodiment the vacuum tumbling process is followed by the step of freezing the vacuum tumbled food product in a liquid freeze bath. In an alternate embodiment, the vacuum tumbled food product is coated with a second dispersion of a lipid in an aqueous starch solution. These embodiments are described in further detail below.

As used herein, "food product" refers generally to any edible item. In specific embodiments according to the present invention, the food product is a protein based food product, which includes, but is not limited to, meats, poultry and seafood. In a more specific embodiment according to the present invention the food product is a seafood product, such as shrimp, fish or the like. In yet further embodiments, the food product is a soup related component, such as a component of a cream based soup product. Those skilled in the art will appreciate, however, that any edible food product, whether natural or artificial, may be subjected to the processes of the present invention without departing from the scope or spirit of the present invention, as the type of food product incorporated in this procedure is not intended to be limiting.

Aqueous Flavor Solution

The food products and processes for preparing such food products of the present invention comprise an aqueous flavor solution. In exemplary embodiments, processes for preparing food products according to the present invention may comprise a vacuum tumbling step wherein the aqueous flavor solution marinates and/or flavors the vacuum tumbled food product. As used herein, "vacuum tumbled food product" refers generally to any food product which has been subjected to a vacuum tumbling procedure. As used herein, "aqueous flavor solution" refers generally to a solution which infuses and/or flavors a food product with at least one flavoring ingredient. It should be understood that aqueous flavor solutions useful according to the present invention may comprise any arrangement of the at least one flavoring ingredient. For instance, in exemplary embodiments the aqueous flavor solution may comprise a preformed marinade flavoring. In further embodiments, the aqueous flavor solution may comprise a combination of a preformed marinade flavoring together with one or more additional flavoring ingredients. Suitable flavoring ingredients of the aqueous flavor solution include, but are not limited to, flavors, herbs, spices, flavor enhancers and the like. As used herein, "herb" refers generally to a plant based material used in cookery for its savory qualities. As used herein, "spice" refers generally to any of a variety of pungent aromatic vegetable substances used for flavoring food. As used herein, "flavor enhancer" refers generally to an ingredient that gives a distinct and/or enhanced flavor quality to a food product.

In specific embodiments according to the present invention, processes for preparing a food product employ an aqueous flavor solution comprising one or more flavors, herbs, spices or flavor enhancers. However, any flavoring ingredient capable of incorporation into a food product is useful for formulating the aqueous flavor solution according to the present invention, as the above list is not intended to be limiting. Additionally, the flavoring ingredients useful according to the present invention may exist in a variety of forms including, but not limited to, dry powder, aqueous, emulsion or combinations thereof.

In exemplary embodiments, the amount of aqueous flavor solution useful for infusing approximately 1 pound of a food product with flavorings and/or seasonings according to the vacuum tumbling processes of the present invention comprises a mixture of from about 0.10 to about 1 ounces of flavoring ingredient and from about 1 to about 20 ounces of water. In more specific embodiments, the aqueous flavor solution comprises a mixture of from about 0.15 to about 0.80 ounces of flavoring ingredient and from about 5 to about 17 ounces of water. In yet further embodiments, the aqueous flavor solution comprises a mixture of from about 0.20 to about 0.70 ounces of flavoring ingredient and from about 8 to about 15 ounces of water. In still further embodiments, the aqueous flavor solution comprises a mixture of from about 0.28 to about 0.65 ounces of flavoring ingredient and from about 12 to about 13 ounces of water. It should be understood, however, that these amounts are exemplary only and may vary in concentration depending on the type and amount of food product to be vacuum tumbled. Accordingly, those skilled in the art will appreciate that other amounts of such ingredients in similar proportional concentrations may be utilized in accordance with the present invention without departing from the spirit or scope herein. Moreover, it should be understood that other suitable ingredients compatible with the flavor ingredients and/or water of the aqueous flavor solution may also be incorporated into the processes of the present invention without departing from the spirit or scope herein.

While the aqueous flavor solution is capable of penetrating and/or infusing the food product with moisture, marinades, seasonings and/or flavoring, the aqueous flavor solution is preferably capable of reducing the foodborne bacteria present in the food product as a result of the vacuum tumbling step. More particularly, in specific embodiments of the present invention, the vacuum tumbling step reduces foodborne bacteria present in the food product. As used herein, "foodborne bacteria" refers generally to any infectious disease which is spread through a food product. Known bacteria capable of undergoing some level of bacterial reduction according to the present invention include, but are not limited to, pathogenic bacteria, non-pathogenic bacteria, spoilage bacteria, aerobic bacteria, anaerobic bacteria, gram negative bacteria, and gram positive bacteria. Specific examples of pathogenic bacteria which may be reduced in content in the present processes include, but are not limited to, salmonella, listeria, *E. coli*, and the like. Examples of spoilage bacteria include, but are not limited to, aeromonas, pseudomonas, putrefaciens and the like.

The level of bacterial reduction from the vacuum tumbling process will depend on various factors including operator skill, the type of vacuum tumbler insert utilized, the amount of aqueous flavor solution used during the process, and the like. Without being limited by theory herein, in specific embodiments according to the present invention, it is believed that up to 99.5% of the foodborne bacteria may be eliminated as a result of the vacuum tumbling step. Methods such as, but not limited to, flash chromatography may be used for determining bacterial reduction in foodborne processes. For instance, those skilled in the art will appreciate that bacterial reduction may be determined by comparing the bacterial count levels of a food product before and after undergoing the vacuum tumbling processes of the present invention. Additionally, calculating the level of odor associated with the food products according to the present invention upon completion of the vacuum tumbling process may also be helpful for determining bacterial reduction. More particularly, after vacuum tumbling a protein based food product, the presence of a pungent odor may indicate that significant levels of bacteria remain present in the food product, whereas absence of such may indicate significant bacterial reduction. It should be understood, however, that any other known methods for measuring the bacterial reduction of a food product may be utilized according to the present invention without departing from the spirit or scope herein.

Without being limited by theory herein, it is believed that the utilization of an aqueous flavor solution during the vacuum tumbling procedures of the present invention allow the vacuum tumbled food products to exhibit lower levels of fat, cholesterol and triglycerides as compared to unprocessed products due to the decomposition and extraction process during vacuum tumbling. As is known within the art, analyzing devices may be adapted to measure the fat and/or lipid, cholesterol and triglyceride counts of such food products. Additionally, it should be understood that these analyzing techniques may be performed in various sequences without departing from the scope of the present invention.

In exemplary embodiments, the at least one flavoring ingredient of the aqueous flavor solution comprises a blend of seasonings and/or spices, such as VacuSafe™ Premium Marinades available from Creative Culinary Solutions, Inc. As is known and appreciated within the art, VacuSafe™ Premium Marinades are designed for use with the Grovac™ process described in detail above. According to this embodiment, the at least one flavoring ingredient is mixed with water to form the aqueous flavor solution.

The aqueous flavor solution is then added to a vacuum tumbler. Any suitable vacuum tumbler known within the art and useful for such vacuum tumbling processes may be utilized according to the present invention, however, in specific embodiments the vacuum tumbler is preferably a tumbler with an insert manufactured and/or approved by the specifications of Creative Culinary Solutions, Inc. As used herein, "insert" generally refers to a mechanism and/or device capable of churning and/or manipulating a food product within a vacuum tumbler machine. While such vacuum tumblers and their respective inserts are not required, the present inventor has unexpectedly discovered that these tumblers and inserts, particularly tumblers with a vacuum of at least 26 inches, provide good levels of infusion and/or marination and allow the food products to be lifted out of the aqueous flavor solution during the vacuum tumbling process in such a manner that drainage may occur during the infusion process, especially when the relationship between the food product and the aqueous flavor solution is no more than about 50% solution. Additionally, this lifting process is believed to initiate the removal of bacteria and/or other impurities from the food product.

The temperature of the aqueous flavor solution suitable for performing the vacuum tumbling processes according to the present invention may exist within a wide range, as the temperature is not intended to be limiting herein. For example, in exemplary embodiments, the temperature of the aqueous flavor solution may be around room temperature, particularly from about 70° to about 80° F. In yet other embodiments, the temperature of the aqueous flavor solution may be between room temperature and the boiling point of water, particularly from about 70° to about 212° F. In still other embodiments, the temperature of the aqueous flavor solution may be within a range of from about 33° to about 70° F., specifically from about 34° to about 60° F. and more specifically from about 35° to about 50° F.

Dispersion of Lipid in Aqueous Starch Solution

The food products and processes for preparing such according to the present invention also employ one or more dispersions of a lipid in an aqueous starch solution. As used herein, "dispersion" refers generally to a two-phase system where one phase consists of finely divided particles distributed throughout a second phase of a bulk substance, the particles being the disperse or internal phase and the bulk substance the continuous or external phase. The dispersions of the present invention have a continuous aqueous starch phase and a dispersed phase comprising water-immiscible organic lipid materials.

Stable and non-separable compositions comprising microscopic droplets of water-immiscible organic materials uniformly dispersed throughout an aqueous starch phase are disclosed in U.S. Pat. No. 5,882,713, issued Mar. 16, 1999 to Eskins et al, entitled "Non-Separable Compositions of Starch and Water-Immiscible Organic Materials" and U.S. Pat. No. 5,676,994, issued Oct. 24, 1997 to Eskins et al, entitled "Non-Separable Starch-Oil Compositions", both incorporated herein by reference.

As used herein, "lipid" refers generally to fats and/or materials derived from fats which are relatively water-immiscible but soluble in organic solvents, and is intended to include any major division of the lipid family, including fats, oils and waxes. Fats are intended to include glycerol esters of fatty acids, which are chiefly palmitic, stearic, oleic and linoleic; although many other fatty acids are found in nature and also applicable to the present invention. Most known fats exist as triesters of glycerol, while relevant waxes include esters with long chain fatty acids.

Further lipids applicable to the present invention include the conjugated lipids. Conjugated or complex lipids contain other chemical groups in addition to alcohols and fatty acids. Examples or members of this group are the phospholipids, such as lecithin.

Still other applicable lipids comprise the derived lipids, which are breakdown products of the compounds found in the other divisions. Examples of these are glycerol, fatty acids, long chain alcohols and hydrocarbons, and certain vitamins such as vitamins A, D, E and K.

As lipids are broadly understood within the art to encompass a wide range of materials, one skilled in the art will appreciate that other water-immiscible organic materials similarly related to these lipids may also be utilized in conjunction with the products and processes of the present invention without departing from the spirit or scope therein.

Oils useful as the lipid material of the present invention are defined as liquids immiscible with water, generally combustible and soluble in ether. Oils are classified into three categories: (1) fatty substances of vegetable and animal organisms; (2) volatile or essential oils, i.e., the odorous principles of vegetable organisms; and (3) mineral oils, fuel oils and lubricants, i.e., hydrocarbons derived from petroleum and its products.

In exemplary embodiments according to the present invention, lipids comprise fluid and/or edible vegetable oils, for example, the material commonly marketed under the trademark Crisco; the fats of animal origin, such as butter, lard or tallow; and the refined and non-toxic mineral oils commonly referred to as paraffin oil. Although one skilled within the relevant art would appreciate that emulsifying fats are contemplated to fall within the scope of the terms "lipid" and "fat" as used herein, the processes of the invention do not require the inherent emulsifying properties of these materials to yield the highly dispersed starch/water-immiscible material products employed in the present invention. In fact, the starch/water-immiscible materials of the present invention can be prepared in the absence of external emulsifying or dispersing agents by thoroughly solubilizing an aqueous dispersion of the starch at elevated temperatures and incorporating the water-immiscible material into the non-retrograded starch under conditions of high turbulence.

In specific embodiments according to the present invention, the lipid is selected from the group consisting of vegetable oils, essential oils, animal fats, mineral oils, glycerol, waxes and fatty acids.

The aqueous starch solution useful for dispersing the lipid of the present invention is preferably prepared from unmodified starches obtained from cereal grains, such as corn, wheat and rice, or from root crops such as potato and tapioca. An unmodified starch is one that has not been altered by chemical treatment or reduced in molecular weight by reaction with acids or enzymes. Starches from a particular plant variety having amylose and amylopectin components in varying proportions may also be used, for example, waxy cornstarch, having an amylose content of essentially 0%, and/or cornstarch having an amylose content greater than about 25%, such as starch from dent corn varieties. In exemplary embodiments according to the present invention, the amylose content of the starch is less than about 35%.

Without departing from the scope of the present invention, it should be understood that cereal flour may also be used as the aqueous starch solution. Cereal flour is a finely ground meal obtained by the milling of corn, wheat, oats or other cereal grains and consists essentially of the starch and protein components of the endosperm portion of the grain.

The dispersion of lipid in an aqueous starch solution according to the present invention is prepared from starch and lipid materials in amounts ranging from about 5 parts to about 900 parts of lipid, by weight, per 100 parts of starch (that is, the lipid is present in an amount of about 5–90% of the combined starch/lipid material on a dry weight basis). Those skilled in the art will appreciate, however, that fewer than 5 parts of lipid per 100 parts of starch can also be used without departing from the present invention.

In specific embodiments according to the present invention, a level of lipid material approaching 90% by weight (based on the combined weight of starch and lipid) can be employed, however, for most applications the upper limit of the lipid material would not exceed about 65 parts lipid per 100 parts by weight of the starch (40% by weight). In still other embodiments, from about 20 parts to about 40 parts of the lipid material per 100 parts by weight of the starch may be utilized (from about 17 to about 29% by weight).

In an alternative embodiment according to the present invention, the lipid is present in an amount of from about 5% to 65% by dry weight of starch in the aqueous starch solution. In another exemplary embodiment, the lipid is present in an amount of from about 20% to 40% by dry weight of starch in the aqueous starch solution.

In exemplary embodiments, the amount of dispersed lipid/aqueous starch solution useful for infusing approximately 1 pound of a food product according to the present vacuum tumbling processes of the invention is from about 0.10 to about 10 ounces. In more specific embodiments, the amount of dispersed lipid in aqueous starch solution is from about 0.30 to about 5 ounces. In yet further embodiments, the amount of dispersed lipid in aqueous starch solution is from about 0.40 to about 3 ounces. In still further embodiments, the amount of dispersed lipid in aqueous starch solution is from about 0.50 to about 2.5 ounces. It should be understood, however, that these amounts are exemplary only and may vary in concentration depending on the amount and type of food product to be vacuum tumbled. Accordingly, those skilled in the art will appreciate that other amounts of such ingredients in similar proportional concentrations may be utilized in accordance with the present invention without departing from the scope or spirit herein.

Without being limited by theory herein, the present inventors have unexpectedly discovered that the incorporation of a dispersion of a lipid in an aqueous starch solution during the vacuum tumbling processes of the present invention will allow the food products to exhibit an improved creamy mouth feel. As used herein, "creamy mouth feel" refers generally to an eating sensation recognized by a consumer in which a food product exhibits a fresh and/or creamy (moist) property upon consumption despite the product optionally having a crisp outer coating. It is believed that not only does this process allow the consumer to experience a satisfying mouth feel, but it also allows the consumer to better enjoy the taste of the product, as moistness and flavors are better preserved as a result of this procedure.

After the vacuum tumbling step, processes according to the present invention may optionally further comprise a dusting step. More particularly, in exemplary embodiments, the vacuum tumbled food product is dusted with a pre-dust coating comprising, but not limited to, one or more of flour, starches, herbs, spices, flavors, and hydrogenated oils. When the processes for preparing a food product according to the present invention comprise a freezing step, the step of dusting the vacuum tumbled food product is preferably conducted prior to the freezing step.

As used herein, "liquid freeze bath" refers generally to a solution of aqueous fluid within a holding chamber or bath capable of freezing food products. Aqueous fluids suitable for the liquid freeze baths of the present invention, include but are not limited to, liquid nitrogen and the like. Although a liquid is typically used to freeze the food products according to the present invention, it should be understood that other materials, such as gases may be substituted without departing from the scope of the invention, as the freezing process is not intended to be limiting. Other suitable materials useful for the liquid freeze bath include, but are not limited to, liquefied air gases such as oxygen and argon as well as liquid carbon dioxide. Additionally, it should be understood that the freezing process according to the present invention may comprise a fill freezing process, a partial freezing process or a combination of the both. Freezing processes according to the present invention will be explained in more detail below.

In further embodiments, the processes of the present invention may further comprise a step of coating the tumbled food product with a second dispersion of a lipid in an aqueous starch solution prior to the freezing step. This coating may be conducted before or after the dusting step in processes which employ the dusting step. According to this embodiment, the second dispersion may further comprise flavors, herbs, spices and flavor enhancers.

In specific embodiments according to the present invention, processes for preparing a food product may further comprise the step of partially frying the vacuum tumbled food product. According to this embodiment, the partial frying procedure may take place at any time during the food preparation process, however, in exemplary embodiments, the partial frying step occurs prior to a freezing step. Without being limited by theory herein, it is believed that partially frying the food products may enhance the appearance/color of such products prior to baking.

In addition to partially frying the food products of the present invention, in specific embodiments it may be beneficial to further freeze the food products, such as in preparation for shipping, and the like. Accordingly, it should be understood that any freezing procedure known within the art may be utilized in accordance with the present invention, as the disclosed freezing techniques are not intended to be limiting herein.

In one exemplary embodiment according to the present invention, a process for preparing a food product comprises the steps of vacuum tumbling a food product with an aqueous flavor solution and with a dispersion of a lipid in an aqueous starch solution; coating the vacuum tumbled food product with a second dispersion of a lipid in an aqueous starch solution; and freezing the vacuum tumbled food product in a liquid freeze bath. According to this embodiment, the quantitative amount of the second dispersion of lipid in the aqueous starch solution added during the process will vary depending on the given situation. The type and amount of the aqueous starch solution, as well as the type and amount of the lipid to dry weight of starch present in the aqueous starch solution of the second dispersion is not required to be identical to the first dispersion.

Furthermore, while processes for preparing food products according to the present invention may comprise a freezing step, this step may be eliminated without departing from the scope of the invention.

The invention is further directed to food products produced by the processes described in detail above. For instance, in one embodiment a food product is produced by a process comprising the steps of vacuum tumbling the food product with an aqueous flavor solution and with a dispersion of a lipid in an aqueous starch solution and freezing the vacuum tumbled food product in a liquid freeze bath. In another embodiment, a food product is produced by a process comprising the steps of vacuum tumbling a food product with an aqueous flavor solution and with a dispersion of a lipid in an aqueous starch solution, coating the vacuum tumbled food product with a second dispersion of a lipid in an aqueous starch solution, and freezing the coated food product in a liquid freeze bath. It should be understood, however, that the embodiments described above are not intended to be limiting thereof.

Advantages and improvements of the products and processes of the present invention are demonstrated in the following examples. The examples are illustrative only and are not intended to limit or preclude other embodiments of the invention.

EXAMPLE 1

In this example, shrimp (raw or cooked) undergo a vacuum tumbling process according to the present invention. The shrimp may exist in any suitable form prior to the vacuum tumbling procedure, such as, but not limited to, headless, completely peeled and deveined, peeled with tail section still on, headless and unpeeled, and the like. Shrimp may be processed in batches from about 1 to about 5,000 pounds.

The shrimp are placed in a vacuum tumble chamber, together with an insert, such as a VacuSafe™ Premium Marinade or Grovac™ insert. From about 64 ounces to about 400 gallons of water are added to a vacuum tumble chamber along with from about 7 to about 7,500 grams of Grovac Blend™ to form the aqueous flavor solution. Optionally, various flavors, herbs, spices, and the like may also be added to the mixture. The vacuum of the vacuum tumble chamber is preferably at least 26 inches and comprises an insert manufactured and/or approved by the specifications provided by Creative Culinary Solutions, Inc. Additionally, the relationship of the food product to the aqueous flavor solution should typically be no more than about 50% solution for best results.

Next, from about four (4) ounces to fifty (50) gallons of a dispersion of lipid in an aqueous starch solution are added to the vacuum tumble chamber, before sealing the chamber and conducting the vacuum tumbling process. During this stage, various flavors, herbs, spices and the like may be optionally added to the mixture.

The vacuum tumbling process is performed for at least 20 minutes, typically at 8 revolutions per minute. Furthermore, during the vacuum tumbling process, the vacuum source is capable of reducing the internal pressure of the cylindrical drum by at least twenty five inches of mercury (Hg), however, the specific vacuum level may be adjusted based on the age and condition of the food product, as well as other factors.

Upon completion of the vacuum tumbling cycle, the chamber's vacuum seal is released and the shrimp are removed from the chamber, and drained to remove excess liquid.

The shrimp are then dusted or coated with a pre-dust mixture of flour, starches, herbs, spices, flavors, and hydrogenated oils until the average weight of each piece of shrimp is increased by from about 6% to about 20%.

The shrimp are then immersed in a batter containing at least about 5% of a dispersion of a lipid in an aqueous starch solution and flavors and spices such that the viscosity of the batter is sufficient to increase the weight of each individual piece of shrimp, on average, by about 6% to about 20%.

The shrimp are coated with a breading compound, which may contain up to about 5% of a dispersion of a lipid in an aqueous starch solution and flavors and spices such that the weight of each individual piece of shrimp, on average, is increased by about 10% to about 30%.

Optionally, the shrimp are immersed in a fryer, baked in an oven (impingement, convection, or direct heat), grilled or seared for a period of time sufficient to begin a "browning" of the product and to solidify, or "set" the batter and breading, and to reduce or eliminate "flaking" and/or "blow-off" or other loss of breading coverage of the shrimp during the final preparation by the end user.

The shrimp are immersed in an immersion freezer system utilizing liquid nitrogen for a period of time sufficient to effect a "crust freeze" of the breaded shrimp. In other embodiments according to this invention, the nitrogen immersion stage may be eliminated without departing from the spirit of the invention. The shrimp are completely frozen and packaged for shipping.

EXAMPLE 2

In this example, shrimp (raw or cooked) undergo a vacuum tumbling process according to the present invention. The shrimp may exist in any suitable form prior to the vacuum tumbling procedure, such as, but not limited to, headless, completely peeled and deveined, peeled with tail section still on, headless and unpeeled, and the like.

According to this example, 1 pound of shrimp is placed in a vacuum tumble chamber, together with an insert, such as a VacuSafe™ Premium Marinade or Grovac™ insert. Around 12.8 ounces of water at a temperature of from about 35° to 50° F. is added to a vacuum tumble chamber along with from about 0.20 to about 0.65 ounces of Grovac Blend™ and/or Vacusafe™ to form the aqueous flavor solution. Optionally, various flavors, herbs, spices, and the like may also be added to the mixture. The vacuum of the vacuum tumble chamber is preferably at least 26 inches and comprises an insert manufactured and/or approved by the specifications provided by Creative Culinary Solutions, Inc. Additionally, the relationship of the food product to the aqueous flavor solution should typically be no more than about 50% solution for best results.

Next, from about 0.50 to about 2.5 ounces of a dispersion of lipid in an aqueous starch solution are added to the vacuum tumble chamber, before sealing the chamber and conducting the vacuum tumbling process. During this stage, various flavors, herbs, spices and the like may be optionally added to the mixture.

The vacuum tumbling process is performed for at least 20 minutes, typically at 8 revolutions per minute. Furthermore, during the vacuum tumbling process, the vacuum source is capable of reducing the internal pressure of the cylindrical drum by at least twenty five inches of mercury (Hg), however, the specific vacuum level may be adjusted based on the age and condition of the food product, as well as other factors.

Upon completion of the vacuum tumbling cycle, the chamber's vacuum seal is released and the shrimp are removed from the chamber, and drained to remove excess liquid.

The shrimp are then dusted or coated with a pre-dust mixture of flour, starches, herbs, spices, flavors, and hydrogenated oils until the average weight of each piece of shrimp is increased by from about 6% to about 20%.

The shrimp are then immersed in a batter containing at least about 5% of a dispersion of a lipid in an aqueous starch solution and flavors and spices such that the viscosity of the batter is sufficient to increase the weight of each individual piece of shrimp, on average, by about 6% to about 20%.

The shrimp are coated with a breading compound, which may contain up to about 5% of a dispersion of a lipid in an aqueous starch solution and flavors and spices such that the weight of each individual piece of shrimp, on average, is increased by about 10% to about 30%.

Optionally, the shrimp are immersed in a fryer, baked in an oven (impingement, convection, or direct heat), grilled or seared for a period of time sufficient to begin a "browning" of the product and to solidify, or "set" the batter and breading, and to reduce or eliminate "flaking" and/or "blow-off" or other loss of breading coverage of the shrimp during the final preparation by the end user.

The shrimp are immersed in an immersion freezer system utilizing liquid nitrogen for a period of time sufficient to effect a "crust freeze" of the breaded shrimp. In other embodiments according to this invention, the nitrogen immersion stage may be eliminated without departing from the spirit of the invention. The shrimp are completely frozen and packaged for shipping.

The examples and specific embodiments set forth herein are for illustrative purposes only and are not intended to limit the scope of the methods and kits of the invention. Additional methods and kits within the scope of the claimed invention will be apparent to one of ordinary skill in the art in view of the teachings set forth herein.

What is claimed is:

1. A process for preparing a food product, comprising:
   (a) vacuum tumbling a food product with an aqueous flavor solution and with a dispersion of a lipid in an aqueous starch solution under conditions sufficient to reduce bacteria present in the food product; and
   (b) freezing the vacuum tumbled food product in a liquid freeze bath.

2. The process of claim 1, wherein the lipid is selected from the group consisting of vegetable oils, essential oils, animal fats, mineral oils, glycerol, waxes, and fatty acids.

3. The process of claim 1, wherein the aqueous starch solution comprises starch selected from the group consisting of cornstarch, wheat starch, rice starch, potato starch, and tapioca starch.

4. The process of claim 1, wherein the lipid is present in an amount of from about 5% to 65% by dry weight of starch in the aqueous starch solution.

5. The process of claim 1, wherein the lipid is present in an amount of from about 20% to 40% by dry weight of starch in the aqueous starch solution.

6. The process of claim 1, wherein the vacuum tumbling step reduces foodborne bacteria present in the food product.

7. The process of claim 1, wherein the vacuum tumbling step reduces pathogenic bacteria present in the food product.

8. The process of claim 1, wherein the vacuum tumbling step reduces spoilage bacteria present in the food product.

9. The process of claim 1, wherein the aqueous flavor solution comprises flavors, herbs, spices or flavor enhancers.

10. The process of claim 1, further comprising the step of dusting the vacuum tumbled food product in a flour coating prior to the freezing step.

11. The process of claim 10, further comprising the step of coating the dusted food product with a second dispersion of a lipid in an aqueous starch solution prior to the freezing step.

12. The process of claim 11, wherein the second dispersion further comprises flavors, herbs, spices and flavor enhancers.

13. The process of claim 1, further comprising the step of partially frying the vacuum tumbled food product prior to the freezing step.

14. The process of claim 1, wherein the food product is a protein food product.

15. The process of claim 14, wherein the protein food product comprises a seafood product.

16. A process for preparing a food product, comprising:
   (a) vacuum tumbling a food product with an aqueous flavor solution and with a dispersion of a lipid in an aqueous starch solution under conditions sufficient to reduce bacteria present in the food product;
   (b) coating the vacuum tumbled food product with a second dispersion of a lipid in an aqueous starch solution; and
   (c) freezing the coated food product in a liquid freeze bath.

17. The process of claim 16, wherein the lipid is selected from the group consisting of vegetable oils, essential oils, animal fats, mineral oils, glycerol, waxes, and fatty acids.

18. The process of claim 16, wherein the aqueous starch solution comprises starch selected from the group consisting of cornstarch, wheat starch, rice starch, potato starch, and tapioca starch.

19. The process of claim 16, wherein the lipid is present in an amount of from about 5% to 65% by dry weight of starch in the aqueous starch solution.

20. The process of claim 16, wherein the lipid is present in an amount of from about 20% to 40% by dry weight of starch in the aqueous starch solution.

21. The process of claim 16, wherein the vacuum tumbling step reduces foodborne bacteria present in the food product.

22. A process for preparing a food product, comprising vacuum tumbling the food product with an aqueous flavor solution and with a dispersion of a lipid in an aqueous starch solution under conditions sufficient to reduce bacteria present in the food product.

23. The process of claim 22, further comprising:
   coating the vacuum tumbled food product with a second dispersion of a lipid in an aqueous starch solution.

24. A process for preparing a food product, comprising:
   (a) vacuum tumbling a food product with an aqueous flavor solution under conditions sufficient to reduce bacteria present in the food product;
   (b) coating the vacuum tumbled food product with a dispersion of a lipid in an aqueous starch solution; and
   (c) freezing the coated food product in a liquid freeze bath.

* * * * *